United States Patent [19]
Lang

[11] Patent Number: 5,217,328
[45] Date of Patent: Jun. 8, 1993

[54] PNEUMATIC TUBE CONVEYOR SYSTEM

[75] Inventor: Hartmut Lang, Plochingen, Fed. Rep. of Germany

[73] Assignee: Infotronic Vertriebsgesellschaft fur Kommunikationssysteme mbH, Plochingen, Fed. Rep. of Germany

[21] Appl. No.: 763,661

[22] Filed: Sep. 18, 1991

[51] Int. Cl.$^5$ .................. B65G 51/36; B65G 51/40; B65G 51/44
[52] U.S. Cl. ............................................ 406/1; 406/3; 406/4
[58] Field of Search ............................... 406/1–4, 406/112

[56] References Cited

U.S. PATENT DOCUMENTS

| | | | |
|---|---|---|---|
| 4,058,274 | 11/1977 | Hochradel et al. | 406/2 |
| 4,529,335 | 7/1985 | Hilbert et al. | 406/1 |

FOREIGN PATENT DOCUMENTS

| | | | |
|---|---|---|---|
| 1142793 | 1/1963 | Fed. Rep. of Germany | 406/1 |
| 2054759 | 5/1972 | Fed. Rep. of Germany | 406/4 |
| 2128781 | 3/1973 | Fed. Rep. of Germany | 406/4 |
| 2359120 | 5/1975 | Fed. Rep. of Germany | 406/1 |
| 2336326 | 8/1977 | France | 406/1 |
| 106229 | 5/1988 | Japan | 406/3 |

Primary Examiner—Russell D. Stormer
Assistant Examiner—James M. Kannofsky
Attorney, Agent, or Firm—Porter, Wright, Morris & Arthur

[57] ABSTRACT

A pneumatic tube conveyor system comprises at least two dispatching stations (13) for dispatching conveying cases and at least two receiving stations (22) for receiving the conveying cases. Pneumatic tube lines connect the dispatching stations and the receiving stations. An intermediate store (25) is provided within the tube lines. The tube lines are associated with a plurality of gates (21, 26, 33). Control means serve for connecting any dispatching station selectively to any receiving station or to the intermediate store, and for connecting the intermediate store to tube lines leading to any receiving station.

4 Claims, 3 Drawing Sheets

PNEUMATIC TUBE CONVEYOR SYSTEM

The present invention relates to a pneumatic tube conveyor system having a plurality of dispatching stations for dispatching conveying cases, a plurality of receiving stations for receiving the conveying cases, a tube system which connects the dispatching stations and the receiving stations and which comprises a plurality of gates, and control means for connecting any dispatching station selectively to any receiving station.

A pneumatic tube conveyor system of the described type is generally known.

Pneumatic tube conveyor systems are generally used for transporting lightweight articles. A typical application of pneumatic tube conveyor systems is the transportation of in-house mail within a factory plant, i.e., the transportation of papers between a plurality of stations which are at the same time dispatching stations and receiving stations. Further, pneumatic tube conveyor systems are employed in hospitals for distributing papers, but also small-size articles, such as medicines, within the hospital. Finally, another typical application of pneumatic tube conveyor systems is found in credit institutions where the counters, which are accessible to the public, are connected to the central money deposit by a pneumatic tube conveyor system so that large amounts of cash need not be kept the very counters which are accessible to the public.

It is also known that systems for distributing articles and machine elements are required in industrial enterprises where assembly operations have to be performed, for example on special machines. Such machine elements include, on the one hand, large machine components that can be moved only by heavy implements, such as machine chassis or complete pre-assembled units, and on the other hand, at the other end of the dimensional scale, medium-sized and small parts such as screws, nuts, bolts, pins, seals, hoses, valves, and the like.

Until now, such materials or parts were generally distributed manually, by a shop hand who collected the required parts at a materials issue counter using an electric truck or sometimes only a portable box. Such a distribution system obviously is very labor-intensive, and, thus, expensive. This is particularly true when the materials have to be distributed in a large assembly shop having a length of several hundred meters, because then the distances to the materials issue counter get so long that on the one hand a considerable amount of labor is required and, on the other hand, rapid access to the store is virtually impossible if, for example, a specific part is required immediately for a given assembly job. If the assembly shop is large, it may absolutely take a quarter of an hour or even more until the required part has arrived at the assembly position from the materials issue counter. This may lead to the condition that the whole assembly process must be stopped during the waiting time, and such a stoppage may lead to considerable consequential costs.

Now, it is the object of the present invention to improve a pneumatic tube conveyor system of the type described above in such a way that it can be used for distributing assembly materials or the like so that the distribution of materials can be effected in less time and with reduced labor input.

The invention achieves this object by the fact that the pneumatic tube dispatching stations take the form of order picking positions of a parts store, forming together with the latter a materials distribution center, that the pneumatic tube receiving stations are distributed over an assembly shop, that the assembly shop is subdivided into a predetermined number of areas, and that the materials distribution center is equipped with a number of pneumatic tube lines corresponding to the predetermined number, each such line being assigned to one of the areas.

This solves the problem underlying the present invention fully and perfectly because the use of a conventional pneumatic tube conveyor system for distributing assembly materials, and the like, ensures in this manner a materials distribution procedure which is not only quick, but also minimally labor-intensive. This is true all the more because it is possible according to the invention to subdivide a large assembly shop under management aspects into different assembly areas which are conveniently selected in such a way that each of the areas has an approximately equal demand for parts, by volume and weight. If in this case the several areas are served by a plurality of parallel pneumatic tube conveyor lines, then a parallel or multiplex operation is obtained which guarantees particularly quick materials distribution and full surface coverage.

According to a particularly preferred embodiment of the pneumatic tube conveyor system of the invention, the pneumatic tube lines are equipped with an intermediate store.

This feature provides the advantage that buffering is rendered possible between the materials distribution center and the lines which are distributed over the assembly shop. This is important because the filled conveying cases are loaded into the system at the order picking positions of the materials disttibution center in irregular intervals, depending on how long it takes until the person handling an order has filled the respective conveying case. Considering in addition that the dispatching rate from the materials distribution center is already irregular because different travelling times through the lines of the assembly shop have to be allowed for, this situation can be corrected by the provision of the intermediate store, it being now possible for the intermediate store on the one hand to accept filled conveying cases which are dispatched at the order picking positions at irregular intervals, and on the other hand to dispatch conveying cases at irregular intervals, without this leading to a backlog or to unacceptable idle times.

According to a particular preferred further development of this embodiment of the invention, the intermediate store is followed by a gate for connecting the outlets of the intermediate store individually and selectively to the pneumatic tube lines leading to particular receiving stations, or to a buffer store.

It is the advantage of this feature that any conveying cases, which are not to be dispatched, can be separated out from the intermediate store. This may become necessary, for example, when the receiving station signals that due to some malfunction it is temporarily not in a position to receive another conveying case, and when at that time a filled conveying case intended for this station has already been introduced into the tube system at a dispatching station. If this should occur, then the conveying case which was initially to be dispatched and which now is to be retained, can be separated out via a gate upon leaning the intermediate store, and can be transferred to the buffer store from where it can be retrieved and reintroduced into the tube system after the malfunction of the receiving station has been corrected.

According to another preferred embodiment of the invention, each of the dispatching stations connects to a predetermined number of pneumatic tube lines and a pre-sorting device which allocates the conveying cases to be dispatched to the different pneumatic tube lines.

This feature provides the advantage that each receiving station can be addressed from each dispatching station as the person handling an order can feed each conveying case into each of the pneumatic tube lines. Thus, the conveying cases are sorted and distributed over the individual pneumatic tube lines at the dispatching station. This simplifies the arrangement of the tube network in the area of the dispatching stations considerably.

Other advantages of the invention will appear from the specification and the attached drawing.

It is understood that the features that have been described before and will be explained hereafter may be used not only in the described combinations, but also in any other combination, or individually, without departing from the scope and intent of the present invention.

One embodiment of the invention will now be described in more detail with reference to the drawing in which.

Figure 1:
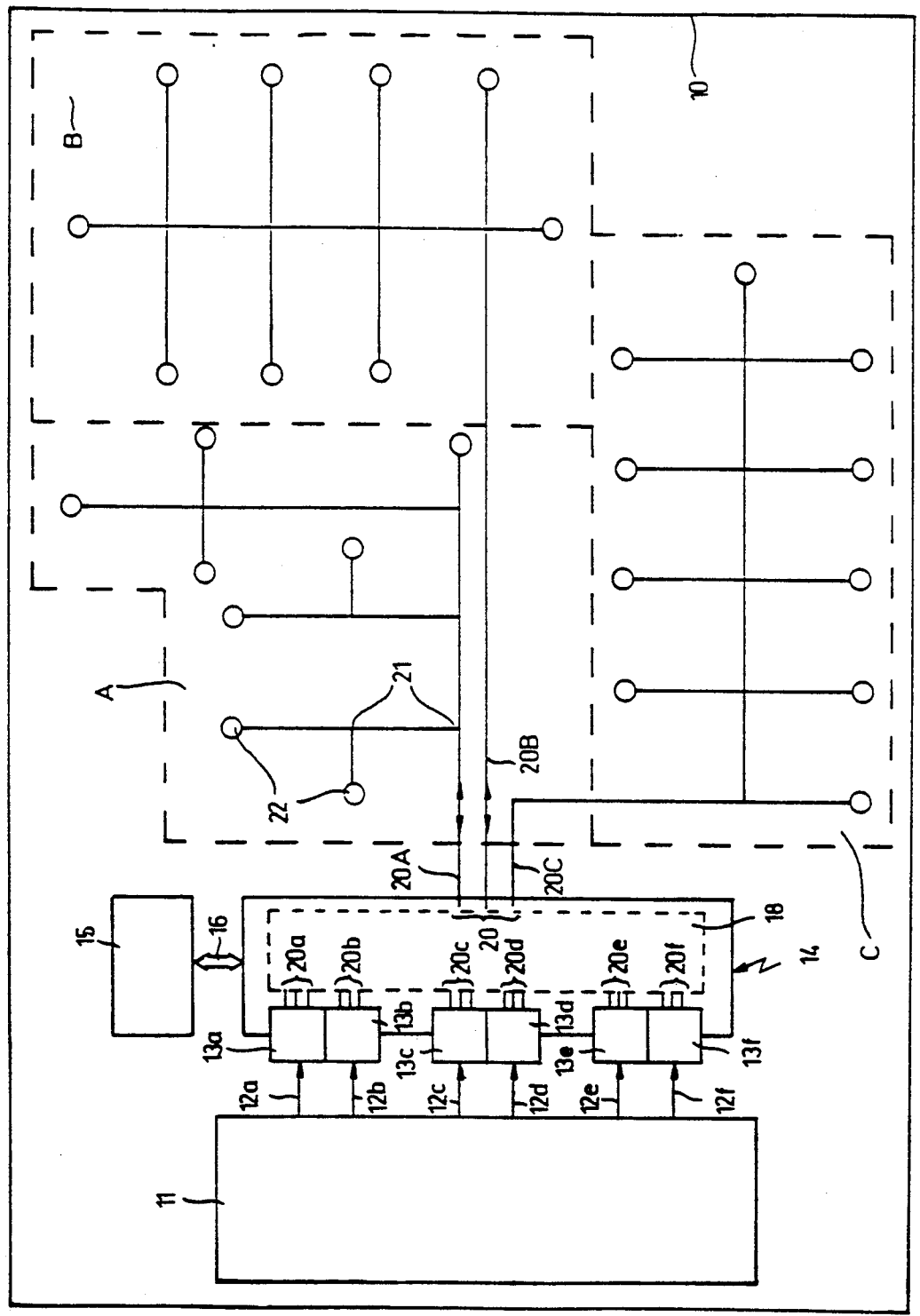
FIG. 1 shows a diagrammatic block diagram of an assembly shop equipped with a pneumatic tube conveyor system according to the invention.

In FIG. 1, the pneumatic tube conveyor station is located within an assembly shop 10 of the type used, for example, in a manufacturing plant for assembling special machines. Assembly shops of this kind include a plurality of assembly work places positions where complete machines are assembled by fitters from parts supplied to these positions. As regards the parts required for this purpose, one usually distinguishes between different dimensional classes, the heaviest parts, for example machine frames or completely pre-assembled units, being distributed in the assembly shop 10 by means of cranes or trolleys, while a distribution system using electric trolleys or fork trucks is used for parts of medium weight.

The present invention deals with a distribution system for small mechanical components or parts, such as screws, nuts, pins, bolts or other parts having weights of up to approximately 15 kg, either individually or grouped by orders.

In the case of FIG. 1, the described parts are kept ready for use in the conventional manner in a parts store 11 in the assembly shop 10. Conveyor systems 12$a$ to 12$f$ provide the possibility to call off the parts individually or by orders from the parts store 11. This is done by workers working at order picking positions 13 where individual orders of parts required at the assembly positions in the assembly shop 10 are prepared for dispatch from the parts arriving from the parts store 11.

In the case of the present invention, the order picking positions 13 are designed as dispatching stations of a pneumatic tube conveyor system. Consequently, the order picking positions 13 are part of a materials distribution center 14 which serves to supply the assembly positions in the assembly shop 10 with parts of the before-mentioned weight range.

The pneumatic tube conveyor system 14 is connected, via a data line 16, to control means designed as a computer 15 which serves first to ensure that the required parts are supplied from the parts store 11. The computer also establishes, in the manner that will be described in more detail below, a connection between one of the dispatching stations 13$a$ to 13$f$ and one of the receiving stations 22.

The assembly shop 10 is subdivided into a predetermined number of areas, the number and location of the areas being selected in such a way that each area has approximately the same demand for parts, by number and/or volume. In the case of the illustrated example, the assembly shop 10 is subdivided into three areas A, B and C.

One end of a conveyor tube system 18 communicates with a plurality of pneumatic tube lines 20, the number of these lines corresponding to the number of areas. In the case of the example illustrated in FIG. 1, therefore, three lines 20A, 20B and 20C are provided, which are assigned to the areas A, B and C, respectively.

As illustrated by way of example for the area A in FIG. 1, the line 20A leads to a first gate or plurality of gates 21 so that the line can be connected to any one of a number of receiving stations 22. By operating the gates 21 in a suitable manner over a plurality of operational positions, it is thus possible, by means of the computer 15, to connect the lines 20A, 20B, 20C to any of the receiving stations 22, each such receiving station 22 being assigned to an assembly position in the assembly shop 10.

Now, it is the function of the pneumatic tube conveyor system to connect each dispatching station 13$a$ to 13$f$ selectively to any receiving station 22 in any area A, B or C, in order to transport conveying cases filled with parts from the dispatching stations 13$a$ to 13$f$ to the receiving stations 22.

In order to ensure that this function can be properly performed, certain arrangements are made in the pneumatic tube conveyor system which will be discussed in detail below.

Figure 2:
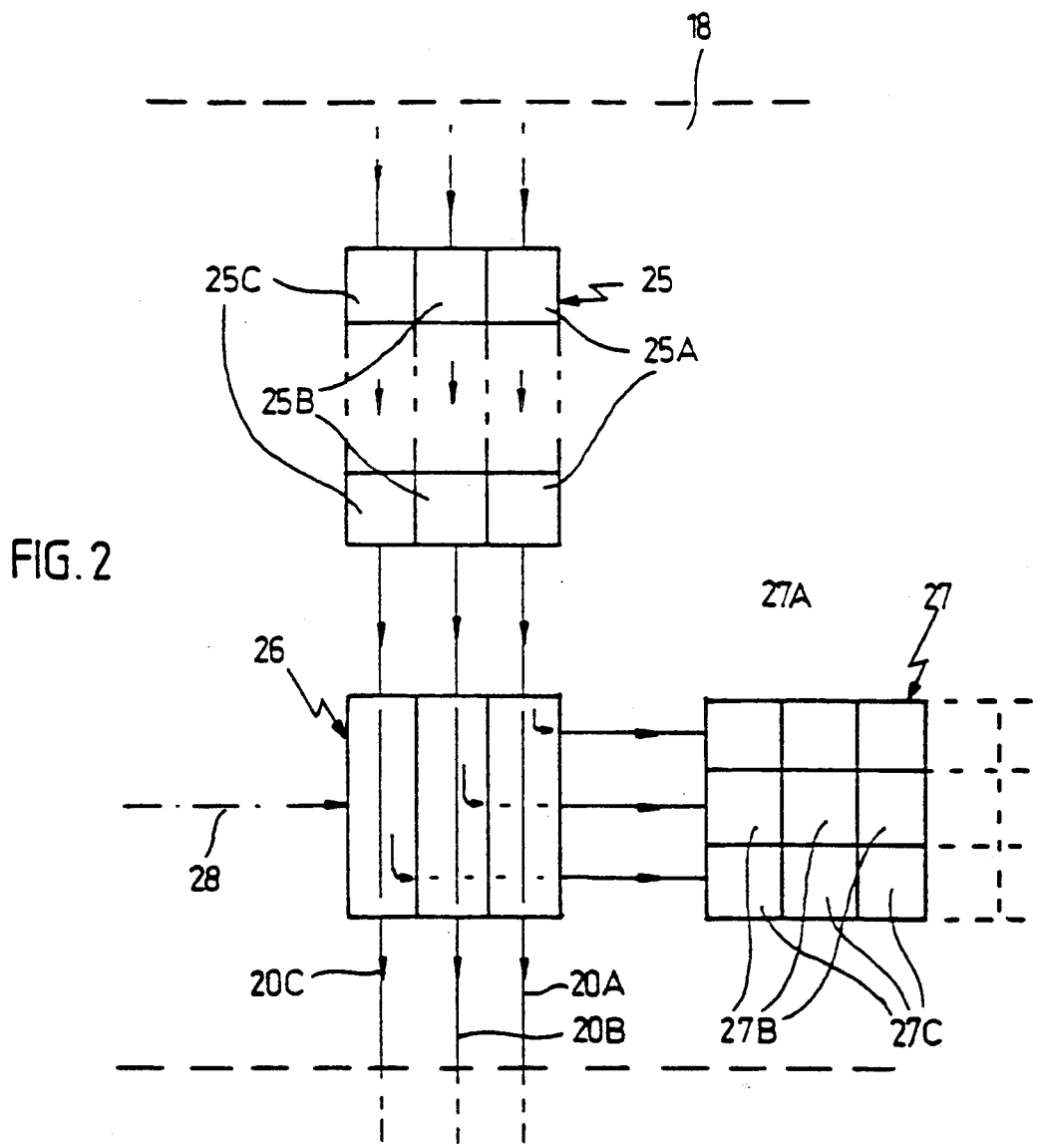
FIG. 2 shows a detail of FIG. 1 illustrating an intermediate store for filled conveying cases.

FIG. 2 shows an intermediate store 25 connected between the lines 20A, 20B and 20C, which store comprises a plurality of outlets and a plurality of storage positions 25A, 25B and 25C, with an outlet and a storage position provided for each of the lines 20A, 20B and 20C.

The intermediate store 25 is followed by a second gate 26, comprising a plurality of operational positions by means of which each outlet of the intermediate store can be connected to the pneumatic tube line 20A, 20B or 20C leading to a particular receiving station, or to a buffer store 27, comprising a plurality of storage positions 27A, 27B and 27C.

This measure serves the following purpose:

At the order picking positions 13$a$ to 13$f$, conveying cases are filled and dispatched at irregular intervals. This is due to the fact that picking the different orders may take different lengths of time, depending on the particular type of order. On the other hand, it is, however, desirable to have the lines 20A to 20C utilized as uniformly as possible so that the greatest possible number of conveying cases can be conveyed per unit of time. The intermediate store 25, therefore, acts as a buffer store which ensures that conveying cases can be dispatched to the areas A, B and C from the outlet of the intermediate store 25 in the manner determined by the computer 15 and that no backlog will build up due to the irregular loading of cases by the order preparing personnel.

In addition, it is rendered possible by the intermediate store 25 to affect the dispatch of conveying cases, for example if information should be received that some trouble exists at one of the receiving stations 22 so that no cases can be received at that moment by the particular station, for example because the operator has failed to unload the preceding conveying cases from the receiving buffer at that location so that the latter is full and not in a position to accept additional conveying cases.

If such a condition occurs, the gate 26 is actuated via the control line 28, connecting the line 20A, 20B or 20C to the buffer store 27. One ensures in this way that if it is determined that a conveying case placed in any of the lines 20A to 20C cannot be received at the envisaged receiving station 22, the respective conveying case will not cause any problems in the area of the receiving station 22 and will also not delay the dispatch of other conveying cases waiting behind it in the lines 20A to 20C.

The conveying cases separated out in this way can then be removed from the buffer store 27 manually and can be dispatched once more from any of the dispatching stations 13a to 13f, for example after the fault conditions at the receiving station 22 have been removed and the station has been released again.

Considering that the flow of parts in an assembly shop 10 can neither be predicted nor pre-sorted at reasonable expense, it is provided in the case of the pneumatic tube conveyor system according to the invention that each of the dispatching stations 13a to 13f can route cases to any receiving station 22 in any area A to C.

Figure 3:
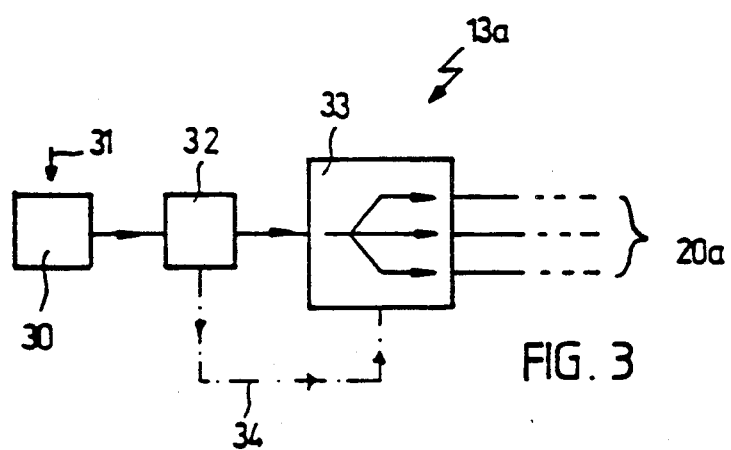
FIG. 3 shows another detail of FIG. 1 illustrating a dispatching station.

FIG. 3 shows in this connection an installation within, e.g., dispatching station 13a for presorting complete conveying cases which provides means for identifying a destination receiving station for each conveying case and means for directing each conveying case to the pneumatic tube line connecting to the destination station for that conveying case. The operator handling the respective order has filled a conveying case with the desired parts, the conveying case having a self-adhesive label preferably printed by a printer, which label contains a machine-readable destination code representative of the respective receiving station 22.

The conveying case filled and prepared in this manner is now introduced by the operator into a loading position 30 at the dispatching station 13a, as indicated by arrow 31 in FIG. 3.

Starting from the loading position 30, the conveying case first passes a reading position 32 where the destination coordinates of the conveying case appearing on the label are read by a suitable scanner. The signals so scanned are converted into a control command which is supplied, via a control line 34, to a third gate 33 between the dispatching stations and the pneumatic tube lines 20A to 20C.

The gate 33, operating over a plurality of operating positions, connects any of the dispatching stations selectively to any of as many outlet tube sections 20a to 20f as lines 20 are provided in the pneumatic tube conveyor system. In the illustrated example, the gate 33 connects with three outlet tube sections 20a, each of which communicates via the conveyor tube system 18 with one of the lines 20A to 20C, thereby directing each conveying case into a line 20 connecting to the appropriate destination receiving station for that conveying case.

The lines 20A to 20C are designed as bidirectional lines, as indicated by the double arrows in FIG. 1.

Figure 4:
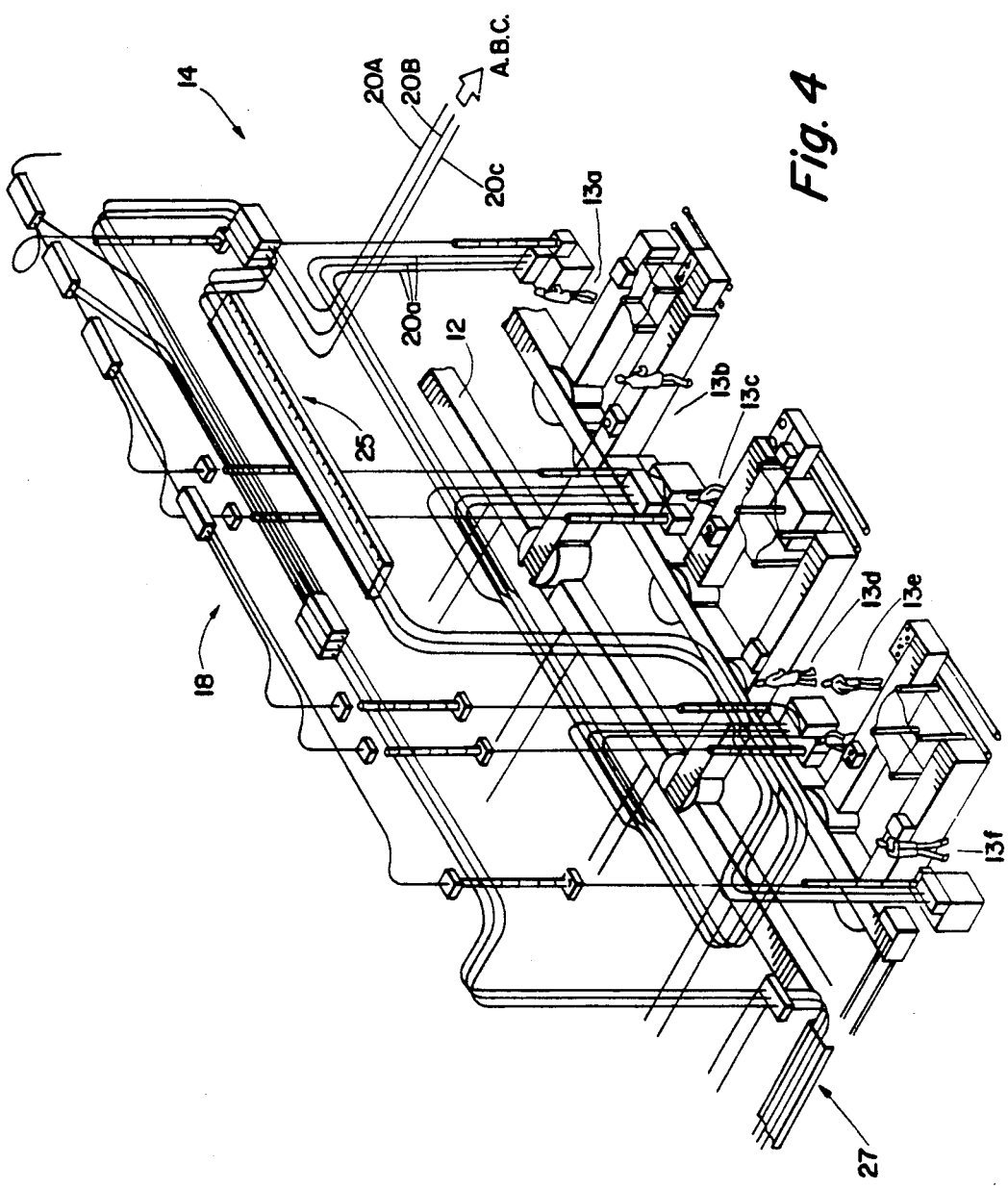
FIG. 4 shows a perspective view of dispatching stations and an intermediate store for filled conveying cases of a pneumatic tube conveyor system according to the invention.

FIG. 4 shows that each conveying case leaving the intermediate store 25 for being dispatched is diverted by the gate 26 by 180°, and is then dispatched to the area for which it is intended, via the lines 20A to 20C.

In the case of one practical example of a pneumatic tube conveyor system, an assembly shop which has a length of 560 m and which is subdivided into three areas, is supplied with a total of approximately 2300 dispatched cases during 15 hours, with a reserve of 30%. The conveying cases may have a total weight of up to 7 kg. The forwarding tube has a nominal width of 160 mm, so that a loading diameter of 110 mm and a loading length of 400 mm is obtained for the conveying cases. The conveying cases travel at a speed of approximately 6 m/s.

I claim:

1. A pneumatic tube conveyor system for transporting conveying cases, comprising:
    at least two pneumatic tube dispatching stations;
    at least two pneumatic tube receiving stations;
    at least two pneumatic tube lines arranged between said pneumatic tube dispatching stations and said pneumatic tube receiving stations;
    a first gate arranged between said pneumatic tube dispatching stations and said pneumatic tube lines, said first gate comprising a plurality of operational positions for connecting any of said pneumatic tube dispatching stations to any of said pneumatic tube lines;
    a second gate arranged between said pneumatic tube receiving stations and said pneumatic tube lines, said second gate comprising a plurality of operational positions for connecting any of said pneumatic tube receiving stations to any of said pneumatic tube lines;
    an intermediate store arranged within said pneumatic tube lines, said intermediate store comprising a plurality of outlets;
    a third gate arranged between said intermediate store and said pneumatic tube receiving stations, said third gate comprising a plurality of operational positions for connecting any of said outlets to any of said pneumatic tube lines leading to said pneumatic tube receiving stations; and
    control means for selecting one of said plurality of operational positions of said first gate, one of said plurality of operational positions of said second gate, and one of said plurality of operational positions of said third gate.

2. The system of claim 1, further comprising:
    means within any of said pneumatic tube dispatching stations for identifying one of said pneumatic tube receiving stations as a destination pneumatic tube receiving station of any of said conveying cases and directing any of said conveying cases into one of said pneumatic tube lines connecting to said destination pneumatic tube receiving station.

3. The system of claim 1 wherein said pneumatic tube lines comprise bidirectional pneumatic tube lines.

4. The system of claim 1, further comprising:
    a buffer store associated with said third gate, said plurality of operational positions of said third gate further comprising an operational position affording access from said intermediate store to said buffer store.

* * * * *